United States Patent Office 3,187,168
Patented June 1, 1965

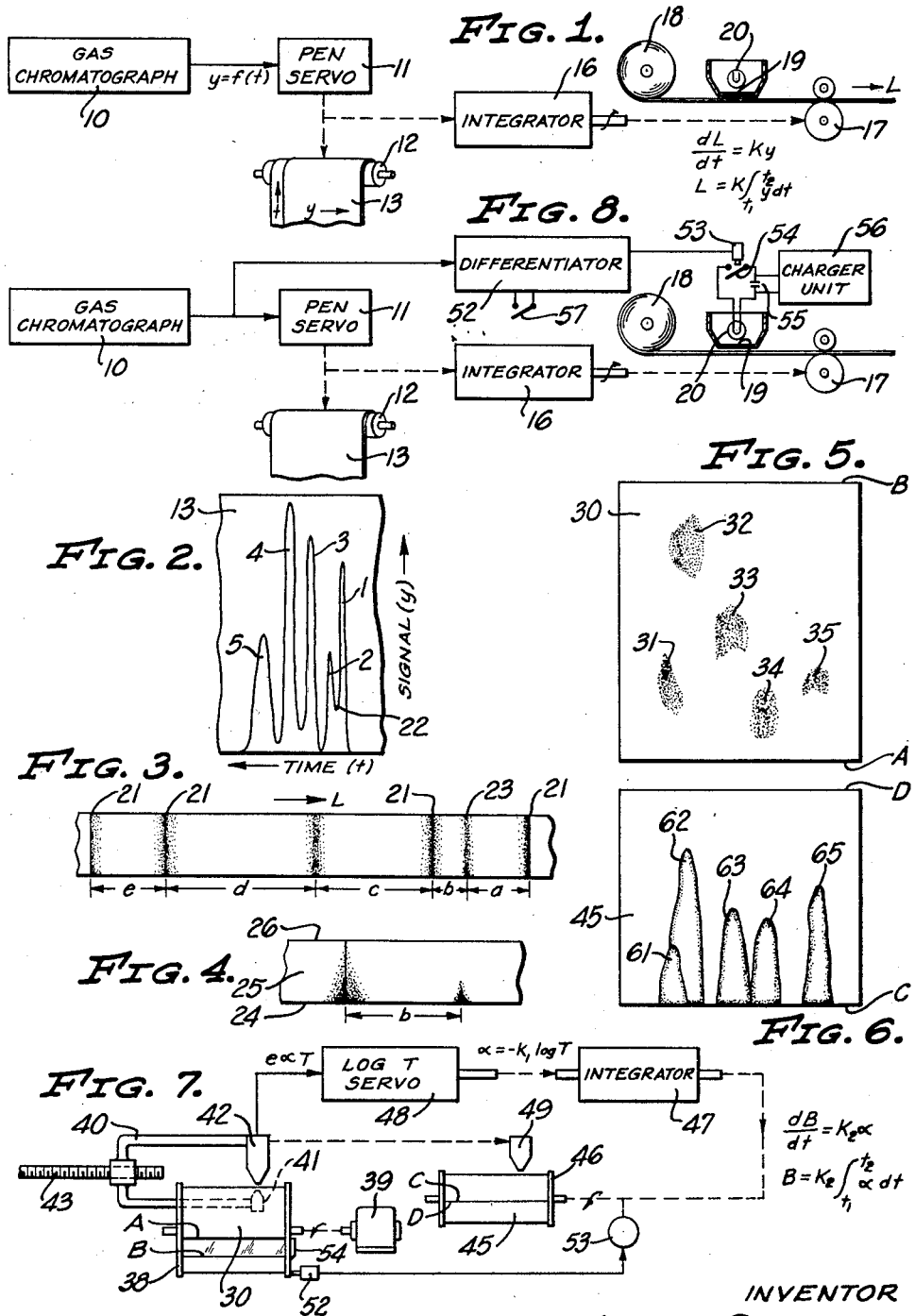

3,187,168
INTEGRATOR
Allen Strickler, Fullerton, Calif., assignor to Beckman Instruments, Inc., a corporation of California
Filed Feb. 23, 1960, Ser. No. 10,284
11 Claims. (Cl. 235—183)

This invention relates to an apparatus for recording variations in a quantity and, in particular, to apparatus which records the integral of a quantity, for example, the integral of an electrical signal. In some types of analytic and physical testing instruments, the output signal or dependent variable is recorded as a function of an independent variable, such as time, producing a curve wherein the desired quantitative information is the area under the curve or a selected portion thereof such as a peak in the curve. Hence, the integral of the signal from the measuring instrument must be obtained. This type of analysis is typical of gas chromatography and occurs in other types of measurement such as absorption spectroscopy and the tensile testing of materials.

It is an object of the invention to provide apparatus for recording the integral of a signal from a gas chromatograph or the like which apparatus is inexpensive and dependable, and which provides an immediate and directly readable indication.

The invention contemplates the use of a recording medium and means for marking on the medium and it is an object to provide apparatus wherein the recording medium is driven as a function of the integral of the incoming signal with the marking means operating at constant intensity or flux so that the resulting indication is a function of the rate of movement of the medium. Another object is to provide such apparatus in which the recording medium may take various forms such as strip charts, circular charts, cylindrical rotating charts, and the like. A further object is to provide such apparatus which may utilize various types of marking means including light sources, heat sources, vibrating pens, sprays, and the like.

It is an object of the invention to provide apparatus for recording the integral of a signal including an integrator, means for coupling the signal to the integrator input, a recording medium, a drive unit for advancing the recording medium, means for coupling the integrator output to the drive unit in driving relation to advance the medium in proportion to the integral of the signal, and means for marking on the recording medium with constant marker intensity or marking flux. A further object is to provide such apparatus wherein the recording medium is a light sensitive paper and the marking means is a light source of substantially constant intensity.

It is an object to provide integrating type recording apparatus suitable for use with records having spots of varying area and density such as occur in paper chromatography. A further object is to provide apparatus for recording the integral of the signal obtained from scanning such records wherein the signal varies with the size of the spot and the density, i.e., the quantity of material deposited to form the spot. A further object is to provide such apparatus wherein the signal resulting from scanning the spot may be modified to properly correlate the sensing system with the characteristic being measured. For example, in paper chromatography the sensing system may measure the percent of light transmission of the spot which is a logarithmic function of the actual quantity of material comprising the spot.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a diagrammatic representation of a preferred form of the invention;

FIG. 2 is a typical chart showing the output of a gas chromatograph;

FIG. 3 is a record produced by the invention for the output of FIG. 2;

FIG. 4 is an alternative form of the record of FIG. 3;

FIG. 5 is a typical record from paper chromatography;

FIG. 6 is a corresponding record as produced by the instrument of the invention;

FIG. 7 is a diagrammatic representation of an alternative form of the invention for producing the record of FIG. 6; and FIG. 8 is a diagrammatic representation of another alternative form of the invention.

In the apparatus of FIG. 1, the output signal $y$ of a gas chromatograph 10, varying as a function of time $t$, is coupled to a conventional recorder including a pen servo 11 and a chart drive 12. The chart drive advances the chart paper 13 at a constant rate in a first direction and the pen servo moves the marking pen in a second direction transverse to the direcion of motion of the chart paper to produce a record of $y=f(t)$ such as that shown in FIG. 2. In a gas chromatograph, the time of occurrence of each peak in the output signal identifies the constituent of the sample which produces the peak while the area under the peak is proportional to the quantity of this particular constituent in the sample. Hence, it is often desirable to integrate the resulting record to provide an accurate quantitative analysis of the sample.

The pen servo 11 which drives the marking pen over the chart paper 13 also drives the input of a continuous integrator 16. The output of the integrator, usually comprising rotation of a mechanical shaft, is coupled to another chart drive 17 which advances a strip of light sensitive paper 18 past a slit 19, a light source 20 of substantially constant intensity being positioned behind the slit. The sensitive paper may conveniently be of the type represented by Kodak Linagraph Direct Print paper, producing an image directly without need of wet development. The strip is driven by the integrator at a rate which is a function of the integrator input signal, being ordinarily proportional thereto. The distance L which the paper 18 moves past the light source is accordingly proportional to the integral of the output of the gas chromatgroph, as indicated by the equations in FIG. 1, and produces a record as shown in FIG. 3. The record in FIG. 3 will have dark lines as at 21 produced when the paper is standing still, or nearly still, with the areas between these dark lines shading from dark to light depending upon the rate of movement of the paper past the slit 19. The minimum 22 occurring between the unresolved peaks 1, 2 of the chromatgraph output, as seen in FIG. 2, will be indicated by a dark band 23 in the record of FIG. 3, which band will ordinarily not be as dark nor as sharp as the lines 21.

The information of interest in the record of FIG. 3 is the distances $a$, $b$, $c$, $d$ and $e$ between the successive zero points or minima. The distances $a$, $b$, $c$, $d$ and $e$ correspond to the areas 1, 2, 3, 4 and 5, respectively, of FIG. 2 and, hence, are portional to the integral of the signal. The exact densities in the developed pattern are obviously of no consequence, so that variations in sensitivity of the paper, moderate fogging, moderate variations in constancy of the light source, etc. are without effect on the accuracy of integration.

It may be desirable in some cases to illuminate the slit 19 of FIG. 1 nonuniformly rather than substantially uniformly as suggested by FIG. 3. That is, the intensity of illumination at one end of the slit may be made much greater than that at the other, for example by eccentric positioning of the light source. This, in effect, increases the useful exposure latitude of the sensitive strip. For example, with uniform illumination, an exposure sufficient to develop a sharp line between well-resolved peaks (say peaks 2 and 3) may be insufficient to leave an impression between less-resolved peaks such as 1 and 2. If exposure is increased, on the other hand, to develop a band between peaks 1 and 2, the line between 2 and 3 may be excessively broadened. The effect of nonuniform illumination is shown in FIG. 4. The lower edge 24 of the strip 25, exposed under the brighter end of the slit, is properly exposed for the less-resolved peaks and overexposed for the well-resolved. The upper edge 26 is underexposed for the poorly-resolved and well exposed for the fully-resolved peaks. An obvious alternative arrangement is to taper the slit, or else to have discrete increments of slit width along the length of the slit (provided, however, that the maximum slit width is not such as to reduce unduly the reading accuracy of the integration data).

The apparatus of FIG. 1 produces an immediate, continuous and directly measurable record of the integral of the incoming signal. While a very simple form of the apparatus is shown in FIG. 1, various refinements can be introduced if desired. The integrator 16 is shown as a mechanical integrator such as a ball and disc integrator driven by the pen servo. Alternatively, for more accurate integration, a rate servo type integrator having the electrical output of the chromatograph as a input may be substituted. In this form of integrator, the rate of rotation of a servomotor output shaft (measured by a tachometer) is caused to be continuously proportional to the input signal, hence angular excursion of the output shaft is proportional to the integral of the input signal. Also, other types of recording medium and marking means can be substituted for the light sensitive paper 18 and the light source 20. For example, a heat sensitive paper and a hot wire or hot knife edge may be used. Other possibilities include ordinary chart paper in association with a vibrating pen, or with an ink or paint spray of constant volume. The basic requirement is that the marking means exert a substantially constant influence, the effect of which may be accumulated upon the recording medium and made visible, so that as the rate of movement of the medium past the marking zone varies, the intensity of the mark thereon will also vary. Expressed differently, the marker delivers a constant flux to the marker medium, whether of radiant energy, conductive heat, flowing ink, or the like, the varying accumulation of which on the variable speed medium is made visible or otherwise detectable. Also, it should be noted that while a straight strip of paper has been used as a recording medium, circular charts and cylindrical charts are equally applicable.

The present invention can be extended to integrations wherein functions of two variables are involved and is described herein in conjunction with the analysis of the record produced in two-dimensional paper chromatography. FIG. 5 illustrates a typical two-dimensional paper chromatograph record which comprises a sheet of paper 30 with spots 31–35 thereon. The spots are of irregular outline and varying sizes, each spot being produced by a quantity of a particular constituent, and the concentration of the constituent varying over the area of the spot. Hence, neither a single measurement of spot density, nor spot density combined with a measurement of the area of the spot, will provide an accurate indication of the total quantity of the constituent present. A suitable apparatus for analyzing the record of FIG. 5 is shown in FIG. 7.

A drum 38 is driven at a constant speed by a motor 39. The drum has a tubular body of transparent glass or plastic and the sheet 30 is wrapped around the drum with a gap between the edges A and B of the sheet, as indicated. A sensing unit including a U-shaped arm 40 with a light source 41 and a photocell pickup 42 is traversed parallel to the axis of the drum by a lead screw 43 to scan the sheet 30. The source 41 produces a small spot of light of constant intensity and the pickup 42 generates an electrical signal $e$ that is proportional to the light transmittance T of the paper.

A sheet 45 of light sensitive paper is wrapped on a drum 46 which is driven by the output of an integrator 47. The signal from the pickup 42 is coupled as the input to a computer or logarithmic servo-positioner 48 which in the embodiment shown herein is a servo producing an output $\alpha$ proportional to the negative logarithm of the input thereto. The output of the computer 48 is coupled to the integrator 47 as an input. A light source 49 is positioned at the drum 46 and is driven by the lead screw 43 is synchronism with the source 41 and pickup 42 so as to traverse the sheet 45 as the sensing unit traverses the sheet 30. The drum 38 and the drum 46 are synchronized once per revolution so that when the edge A of the sheet 30 is under the sensing unit, the edge C of the sheet 45 will be under the light source 49. This may be accomplished by means of a switch 52 and a motor 53, the switch 52 being closed by a cam 54 when the edge B passes the sensing unit and opened when the edge A passes, with the closed switch energizing the motor 53 to drive the drum 46 at relatively high velocity to the position with the edge C at the light source 49. The motor 53 must be fast enough, if need be, to drive drum 46 a full revolution during closure of switch 52. In any event, motion of the drum 46 during the resynchronizing action is rapid enough to prevent an appreciable darkening of the sensitive sheet 45.

It is also possible, in lieu of the motor 53, to use for this periodic synchronization the constant speed motor embodied in the integrator 47. In this case the switch 52, operating a clutching means if necessary, may act to connect and disconnect the integrator motor from the integator as required, and correspondingly to couple it to drum 46. Alternatively, motor 53 may be eliminated merely by providing a very high density or opaque zone on drum 38 between the edges A and B. When this zone passes under the sensing head 42, the large signal out of the log servo causes the integrator output to drive drum 46 at a maximum or saturation-level velocity to advance the edge C to the light source.

At the start of the scanning process with the sensing unit at the lower left corner of the sheet 30, the signal to the computer 48 will be a maximum and the output thereof a minimum, this minimum being compensated or adjusted to zero so that the drum 46 is standing still. When a portion of a spot passes the sensing unit, the signal $e$ will decrease as a function of the density of the spot, producing an output from the computer for driving the integrator and thereby the drum 46. After any spot has passed the sensing unit, the signal to the integrator drops to zero and the drum 46 remains stationary. Finally the edge B arrives at the sensing unit, at which time, by means of the switch 52 and the motor 53, the drum 46 is rotated to complete a revolution and place the edge C at the light source 49. This process continues for each revolution of the drum 38 as the sensing unit is moved thereacross by the lead screw 43 and produces a record such as that shown in FIG. 6 on the drum 46. Since the relative velocity of the paper 45 and the light source 49 is zero at the boundaries of a spot, the corresponding figure traced on the sheet 45 is bounded by a dark line with lighter shades in the interior where the relative velocity was higher. In the record of FIG. 6, the areas 61–65 correspond to the spots 31–35, the area of each zone being proportional to the integrated negative logarithm of the transmittance of the corresponding spot. Since the negative logarithm of the transmittance, or optical absorption density, is directly proportional to the concentration of the constituent at any given point of measurement, the area of each zone 61–65 is proporional to the total quantity of the constituent forming the spot. The area of each zone may be measured by conventional means such as a planimeter. Alternatively, and more conveniently, the areas may be cut out and weighed to provide proportional measurements of the various constituents.

The alternative types of recording media and marking means disclosed in conjunction with the embodiment of FIG. 1 may also be used with the embodiment of FIG. 7 in place of the light sensitive sheet 45 and the constant intensity light source 49. Also, the operation performed by the computer 48 may be changed or the computer may be omitted, depending upon the particular relationship between the characteristic measured by the sensing unit and the concentration of the material at the point of measurement. For example, the constituents of the sample which form the spots in the paper chromatograph may be fluorescent. Then the sensing unit may be a fluorescent light sensitive device which provides a signal directly proportional to the amount of radiation impinging thereon. This signal will also be substantially proportional to the quantity of the material constituting the spot and, hence, can be used to drive the integrator directly withou requiring any inermediate computation or functional conversion.

FIG. 8 shows an embodiment similar to that of FIG. 1 in which, rather than having continuous illumination of the slit, the light is emitted in brief occasional pulses only. A pulse occurs at the start of each peak in the record. Thereby a set of sharp lines occurs on the sensitive strip, the separation between lines being, as before, a measure of the respective peak areas. One of a variety of possible methods of timing the light pulse is shown in FIG. 8. The signal from the chromatograph 10 is coupled to a differentiator 52 which drives a relay 53. The relay contacts 54 are connected in series with a capacitor 55 across the light source 20. A charger unit 56 is connected across the capacitor 55. A manual switch 57 is connected to the differentiator 52 to simulate a signal from the chromatograph.

The differentiator 52 may, for example, be an electrical circuit that senses the slope or rate of change of the signal. When a slope is positive, the relay 53 is energized; when negative, de-energized. Accordingly, on first appearance of each new peak (characterized by appearance of a positive signal slope) the capacitor 55 is discharged through the lamp 20. When the last peak has passed, switch 57 on the differentiator 52 may be closed manually to produce the final line on the record.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an apparatus for recording the integral of a varying quantity, the combination of: an integrator having an output which is the integral of the input thereto; means for applying said quantity as an input value to said integrator input; a recording medium; marking means for marking on said recording medium at a substantially constant flux; a drive unit for advancing said recording medium with respect to said marking means; and means for coupling said integrator output to said drive unit in driving relation to advance said recording medium in proportion to the integral of the quantity whereby the density of the resulting record is a function of the velocity of the recording medium relative to said marking means.

2. In an apparatus for recording the integral of a signal, the combination of: an integrator having an output which is the integral of the input thereto; means for coupling the signal to said integrator input; a light-sensitive recording medium; a drive unit for advancing said recording medium; means for coupling said integrator output to said drive unit in driving relation to advance said recording medium in proportion to the integral of the signal; and a substantially constant intensity light source directed at a zone of said recording medium to produce a pattern with boundaries of maximum density on said recording medium, the integral of the signal being proportional to the dimensions limited by said boundaries.

3. In an apparatus for recording the integral of a varying quantity, the combination of: an integrator having an output which is the integral of the input thereto; means for applying said quantity as an input value to said integrator input; a recording medium; marking means for marking on said recording medium and producing marks of maximum density when said quantity is at a minimum; a drive unit for advancing said recording medium with respect to said marking means; and means for coupling said integrator output to said drive unit in driving relation to advance said recording medium in proportion to the integral of the quantity whereby the distance between maximum density marks on the resulting record is proportional to said integral.

4. In an apparatus for recording the integral of a signal, the combination of: an integrator having an output which is the integral of the input thereto; means for coupling the signal to said integrator input; a recording medium; a drive unit for advancing said recording medium; means for coupling said integrator output to said drive unit in driving relation to advance said recording medium in proportion to the integral of the signal; a record marking source directed at a zone of said recording medium to produce marks on said recording medium; and means for energizing said marking source for a predetermined short interval when said signal changes slope from negative to positive, with the integral of the signal proportional to the distance beween marks.

5. In an apparatus for recording the integral of a signal as a linear quantity, the combination of: an integrator having an output which is the integral of the input thereto; means for coupling the signal to said integrator input; a recording medium; a drive unit for advancing said recording medium past a recording zone; means for coupling said integrator output to said drive unit in driving relation to advance said recording medium in proportion to the integral of the signal; and marking means for marking on said recording medium at said zone with constant flux to produce markings of maximum density when the signal is a minimum, with the linear distance between said maximum density markings being a measure of the integral of the signal between the corresponding minima.

6. In an appauatus for recording the integral of a signal as a linear quantity, the combination of: an integrator having an output which is the integral of the input thereto; means for coupling the signal to said integrator input; a light-sensitive recording strip; a drive unit for advancing said strip past a recording zone; means for coupling said integrator output to said drive unit in driving relation to advance said strip as a function of the integral of the signal; and a substantially constant intensity light source directed at said zone to produce transverse markings thereon of maximum density when the signal is a minimum, with the distance between said maximum density markings being proportional to the integral of the signal between the corresponding minima.

7. In a recording apparatus, the combination of: a first recording medium; a first drive unit for advancing said first recording medium in a first direction at a constant rate; first marking means for marking on said first recording medium; servo means for driving said first marking means in a second direction as a function of an incoming signal; an integrator having an output which is the integral of the input thereto; means for coupling said servo means to said integrator input; a second recording medium; a second drive unit for advancing said second medium past a recording zone; means for coupling said integrator output to said second drive unit in driving relation to advance said second recording medium in proportion to said integrator output; and second marking means for marking on said second recording medium at said zone with constant flux whereby the density of the resulting record is a function of the velocity of the second recording medium.

8. In an apparatus for integrating the quantity of substance contained in spots on a record, which spots vary in area and concentration of said substance, the combination of: sensing means for producing a signal which varies as a function of the concentration of a zone within a spot on a record; first drive means for advancing said sensing means with respect to the record in a first direction; second drive means for advancing said sensing means with respect to the record in a second direction; an integrator having an output which is the integral of the input thereto; means for coupling said signal to said integrator input; a recording medium; marking means for marking on said recording medium at a constant flux; third drive means for advancing said marking means with respect to said recording medium in a third direction in synchronism with said first drive means; fourth drive means for advancing said marking means with respect to said recording medium in a fourth direction; and means for coupling said integrator output to said fourth drive means in driving relation to advance said marking means in said fourth direction as a function of the integral of said signal.

9. In an apparatus for integrating the quantity of substance contained in spots on a record, which spots vary in area and concentration of said substance, the combination of: sensing means for producing a signal which varies as a function of the light transmittance of a zone of a spot on a record; first drive means for advancing said sensing means across the record in a first direction; second drive means for advancing said sensing means across the record in a second direction at a constant rate; an integrator having an output which is the integral of the input thereto; computer means for coupling said signal to said integrator input, with the output of said computer means being proportional to the negative logarithm of the input thereto; a recording medium; marking means for marking on said recording medium at a constant flux; third drive means for advancing said marking means across said recording medium in a third direction in synchromism with said first drive means; fourth drive means for adavncing said marking means across said recording medium in a fourth direction; and means for coupling said integrator output to said fourth drive means in driving relation to advance said marking means in said fourth direction in proportion to the integral of the negative logarithm of said signal.

10. In an apparatus for integrating the quantity of substance contained in spots on a record, which spots vary in area and concentration of said substance, the combination of: a first drum for receiving the record; sensing means for producing a signal which varies as a function of said concentration in a zone of a spot on the record; first drive means for advancing said sensing means across the record along the axis of said first drum; second drive means for rotating said first drum at a constant rate; an integrator having an output which is the integral of the input thereto; means for coupling said signal to said integrator input; a recording medium; a second drum for receiving said recording medium; marking means for marking on said recording medium at a constant flux; third drive means for advancing said marking means across said recording medium parallel to the axis of said second drum in synchronism with said first drive means; and means for coupling said integrator output to said second drum for rotation thereof as a function of the integral of said signal.

11. In an apparatus for integrating the quantity of substance contained in spots on a record, which spots vary in area and concentration of said substance, the combination of: a first drum for receiving the record; sensing means for producing a signal which varies as a function of said concentration in a zone of a spot on the record; first drive means for advancing said sensing means across the record along the axis of said first drum; second drive means for rotating said first drum at a constant rate; an integrator having an output which is the integral of the input thereto; means for coupling said signal to said integrator input; a light-sensitive recording sheet; a second drum for receiving said sheet; a substantially constant intensity light source directed at an area of said sheet; third drive means for advancing said light source across said sheet parallel to the axis of said second drum in synchronism with said first drive means; and means for coupling said integrator output to said second drum for rotation thereof as a function of the integral of said signal to produce a pattern with boundaries of maximum intensity on said sheet, the integral of the signal being proportional to the area enclosed by said boundaries.

References Cited by the Examiner

UNITED STATES PATENTS

| | | | |
|---|---|---|---|
| 1,795,870 | 3/31 | Legg | 346—33 |
| 2,712,415 | 7/55 | Piety | 235—183 |
| 2,967,749 | 1/61 | Strickler | 235—183 |

OTHER REFERENCES

Pages 112 and 116, 3/52, "A Recording and Integrating Flowmeter," Pressey Electronic Engineering.

Pages 361–2, 1956; Electronic Analog Computers, Korn and Korn, McGraw-Hill.

MALCOLM A. MORRISON, *Primary Examiner.*

CORNELIUS D. ANGEL, WALTER W. BURNS, Jr.,
*Examiners.*